United States Patent
Ancuta et al.

(10) Patent No.: US 10,883,447 B2
(45) Date of Patent: Jan. 5, 2021

(54) AIRCRAFT PROPULSION UNIT HAVING THRUST REVERSER FLAPS CONNECTED TO AN INTER-COMPRESSOR CASING LOCATED BETWEEN THE ENGINE COMPRESSORS

(71) Applicants: SAFRAN AIRCRAFT ENGINES, Paris (FR); SAFRAN NACELLES, Gonfreville l'orcher (FR)

(72) Inventors: Carmen Gina Ancuta, Moissy-Cramayel (FR); Kevin Morgane Lemarchand, Moissy-Cramayel (FR); Olivier Kerbler, Antony (FR); Melody Seriset, Plaisir (FR)

(73) Assignees: SAFRAN AIRCRAFT ENGINES, Paris (FR); SAFRAN NACELLES, Gonfreville l'orcher (FR)

( * ) Notice: Subject to any disclaimer, the term of this patent is extended or adjusted under 35 U.S.C. 154(b) by 119 days.

(21) Appl. No.: 16/074,578

(22) PCT Filed: Feb. 3, 2017

(86) PCT No.: PCT/FR2017/050251
§ 371 (c)(1),
(2) Date: Aug. 1, 2018

(87) PCT Pub. No.: WO2017/134402
PCT Pub. Date: Aug. 10, 2017

(65) Prior Publication Data
US 2019/0040816 A1    Feb. 7, 2019

(30) Foreign Application Priority Data
Feb. 4, 2016  (FR) ..................... 16 50897

(51) Int. Cl.
 *F02K 1/72*  (2006.01)
 *F02K 1/76*  (2006.01)

(52) U.S. Cl.
CPC ............... *F02K 1/763* (2013.01); *F02K 1/72* (2013.01)

(58) Field of Classification Search
CPC ..... F02K 1/64; F02K 1/70; F02K 1/72; F02K 1/76; F02K 1/763; F02K 1/766
See application file for complete search history.

(56) References Cited

U.S. PATENT DOCUMENTS 3,541,794 A * 11/1970 Hans .................. F02K 1/72
                                                      60/226.2
4,716,724 A *  1/1988 Newton ............. F02K 1/72
                                                      239/265.29
(Continued)

FOREIGN PATENT DOCUMENTS

CN    101 678 898 A    3/2010
CN    102 536 513 A    7/2012
(Continued)

OTHER PUBLICATIONS

International Search Report dated May 15, 2017 in PCT/FR2017/050251 filed Feb. 3, 2017.

*Primary Examiner* — William H Rodriguez
(74) *Attorney, Agent, or Firm* — Oblon, McClelland, Maier & Neustadt, L.L.P.

(57) ABSTRACT

An aircraft propulsion assembly including a bypass turbojet having a stationary inter-compressor casing positioned upstream from a space between passages, a nacelle including at its downstream end an inner wall that defines the outside of the space between passages and the inside of the bypass stream flow passage, and an outer wall arranged around the inner wall and that defines the outside of the bypass stream flow passage, at least a portion of the inner wall being
(Continued)

suitable for moving between a maintenance position and a working position, and a thrust-reverser including a downstream element of the outer wall that is movable in translation between a retracted position and a thrust-reversal position in which it allows bypass stream deflector elements to be deployed in a radial direction, the deployment of the stream deflector elements being controlled by guide rods.

5 Claims, 2 Drawing Sheets

(56) References Cited

U.S. PATENT DOCUMENTS

| | | | | |
|---|---|---|---|---|
| 5,054,285 | A | | 10/1991 | Geidel et al. |
| 5,251,435 | A | * | 10/1993 | Pauley .................. B64D 29/00 244/54 |
| 5,655,360 | A | * | 8/1997 | Butler ...................... F02K 1/72 239/265.29 |
| 5,706,649 | A | * | 1/1998 | Robinson ................ F02K 1/008 239/265.13 |
| 5,806,302 | A | * | 9/1998 | Cariola .................... F02K 1/09 239/265.29 |
| 6,434,927 | B1 | * | 8/2002 | Stretton .................... F02K 1/72 239/265.31 |
| 2001/0010148 | A1 | * | 8/2001 | Michel ...................... F02K 1/72 60/226.1 |
| 2005/0086927 | A1 | * | 4/2005 | Lair .......................... F02K 1/72 60/226.2 |
| 2009/0151320 | A1 | * | 6/2009 | Sternberger ............. F02K 1/72 60/226.2 |
| 2009/0288386 | A1 | * | 11/2009 | Marshall ................... F02K 1/09 60/204 |
| 2011/0139897 | A1 | * | 6/2011 | Metezeau ................. F02K 1/72 239/265.33 |
| 2012/0247571 | A1 | | 10/2012 | Vauchel et al. |
| 2013/0266423 | A1 | * | 10/2013 | Vauchel .................... F02K 1/72 415/148 |
| 2014/0150403 | A1 | * | 6/2014 | Stuart ....................... F02K 1/72 60/204 |
| 2014/0271163 | A1 | * | 9/2014 | Hue ........................ B64D 29/06 415/201 |
| 2015/0308375 | A1 | * | 10/2015 | Byrne .................... F02K 1/566 239/265.19 |
| 2015/0367946 | A1 | | 12/2015 | Boileau et al. |
| 2016/0169157 | A1 | * | 6/2016 | Sawyers-Abbott ..... F02K 1/763 239/1 |
| 2016/0201602 | A1 | * | 7/2016 | Nakhjavani ............... F02K 1/72 239/1 |
| 2016/0222917 | A1 | * | 8/2016 | Segat ....................... F02K 1/605 |
| 2019/0024609 | A1 | * | 1/2019 | Chuck .................... B64D 29/06 |

FOREIGN PATENT DOCUMENTS

| | | |
|---|---|---|
| CN | 102 812 273 A | 12/2012 |
| CN | 103 796 919 A | 5/2014 |
| CN | 104 024 618 A | 9/2014 |
| CN | 104 797 496 A | 7/2015 |
| CN | 105 209 740 A | 12/2015 |
| EP | 2 551 506 A2 | 1/2013 |
| FR | 0 540 193 A1 | 5/1993 |
| FR | 2 953 490 A1 | 6/2011 |
| FR | 2 999 155 A1 | 6/2014 |
| WO | 2018/028735 A1 | 3/2015 |

* cited by examiner the nacelle, while providing a structure that is simple, lightweight, and compact.

Preferably, the guide rods of the thrust-reverser are fastened to the inter-compressor casing of the turbojet via their second hinged connections comprising ball joints.

Also preferably, the thrust-reverser includes a plurality of guide rods distributed uniformly around a longitudinal axis of the turbojet.

AIRCRAFT PROPULSION UNIT HAVING THRUST REVERSER FLAPS CONNECTED TO AN INTER-COMPRESSOR CASING LOCATED BETWEEN THE ENGINE COMPRESSORS

BACKGROUND OF THE INVENTION

The present invention relates to the general field of aircraft propulsion assemblies comprising a turbojet, e.g. of the high bypass ratio type, and a nacelle in which a thrust-reverser is arranged.

A nacelle in such a propulsion assembly is generally of tubular shape having an air inlet upstream from the turbojet, a middle section surrounding the fan of the turbojet, and a downstream section housing the thrust-reverser. The downstream section of the nacelle also includes an inner annular wall surrounding a portion of a gas generator of the turbojet and an outer annular wall arranged around the inner wall in order to co-operate therewith to define an annular flow passage for a secondary or bypass stream (or "cold" stream) of the turbojet.

Generally, the equipment of the turbojet (such as the embedded computer, the accessory gearbox, electrical harnesses, pipework, etc.) are installed in the annular space inside the nacelle, in the region of its fan zone. Nevertheless, it is becoming and more frequent to install such equipment in a space between passages (also referred to as a "core zone"), i.e. mainly under the inner annular wall defining the inside of the annular flow passage for a bypass stream flowing through the turbojet. That particular arrangement of equipment is sought after in particular when it is necessary to reduce the maximum cross-section—and thus the drag—of such a nacelle.

In order to make it possible to perform periodic maintenance inspections in a space between passages in which equipment is installed, the inner wall of the nacelle includes at least one portion that can be moved between a maintenance position in which it uncovers the space between passages at least in part, and a working position in which it masks that space between passages and defines the inside of the flow passage for the bypass stream. The inner wall may thus comprise two half-shells, at least one of which is suitable for moving between the maintenance position and the working position. Reference may be made to Document FR 2 999 155, which describes an example of such a nacelle with half-shells.

Furthermore, in order to be able to perform maintenance operations in the space between passages of the turbojet, it is generally necessary to open or to move the outer wall of the nacelle in order to be able to open the half-shells of the inner wall.

When the outer wall of the nacelle has a structure of the "C-duct" type, i.e. when the structure is constituted by two half-covers pivotally mounted on hinges at the top portion of the nacelle, access to the space between the passages of the turbojet is provided by opening the half-covers of the outer wall and then by opening the half-shells of the inner wall.

When the outer wall of the nacelle has a structure of the "O-duct" type, i.e. when it is constituted by a single annular cover extending from one side to the other of the suspension pylon to which the nacelle and the turbojet are fitted, access to the space between the passages of the turbojet is obtained by moving the cover in translation along a longitudinal axis substantially parallel to the axis of the nacelle, and then by opening the half-shells of the inner wall.

Finally, when the outer wall of the nacelle has a "D-duct" type structure, i.e. when it is constituted by two half-covers connected to the corresponding half-shells of the inner wall, opening the outer wall of the nacelle causes the inner wall to be opened simultaneously, thereby giving access to the space between passages.

The thrust-reverser that is fitted to such nacelles generally comprises a downstream element of the outer wall that can be moved in translation between a retracted position in which it defines the outside of the flow passage for the bypass stream and a thrust-reversal position in which it allows bypass stream deflector elements (typically flaps) to be deployed radially so as to obstruct the flow passage for the cold stream and redirect the cold stream towards the outside of the nacelle. The linkage enabling the bypass stream deflector elements to be deployed is generally controlled by guide rods that are secured at one end to deflector elements and that are fastened at an opposite end to the inner wall of the nacelle.

Unfortunately, when the inner wall of the nacelle includes at least one movable portion (e.g. half-shells), for performing maintenance operations, and when the outer wall is of the "O-duct" or "C-duct" type, the half-shells of the inner wall are not coupled to the outer wall. Thus, under such circumstances, it is not possible to envisage fastening the guide rods of the thrust-reverser to the inner wall of the nacelle.

OBJECT AND SUMMARY OF THE INVENTION

A main object of the present invention is thus to mitigate such drawbacks by proposing a propulsion assembly architecture in which the fastening of the thrust-reverser guide rods makes it possible to conserve decorrelation between the inner wall and the outer wall of the nacelle.

In accordance with the invention, this object is achieved by an aircraft propulsion assembly comprising:

a bypass turbojet having a space between passages separating a core stream flow passage and a bypass stream flow passage, and a stationary inter-compressor casing positioned upstream from said space between passages;

a nacelle arranged around the turbojet and including at its downstream end an inner annular wall that defines the outside of the space between passages and the inside of the bypass stream flow passage, and an outer annular wall arranged around the inner wall and that defines the outside of the bypass stream flow passage, at least a portion of the inner wall being suitable for moving between a maintenance position in which it uncovers the space between passages at least in part and a working position in which it masks the space between passages; and a thrust-reverser comprising a downstream element of the outer wall that is movable in translation between a retracted position in which it defines the outside of the bypass stream flow passage and a thrust-reversal position in which bypass stream deflector elements are deployed in a radial direction, the deployment of said bypass stream deflector elements being controlled by guide rods, each having a first end fastened via a first hinged connection to a deflector element and a second end fastened via a second hinged connection to the inter-compressor casing of the turbojet.

The propulsion assembly of the invention is remarkable in particular in that the guide rods of the thrust-reverser are fastened at their ends opposite from the bypass stream deflector elements to the inter-compressor casing of the turbojet. Such fastening thus makes it possible to conserve decorrelation between the inner wall and the outer wall of the nacelle (the inner wall and the outer wall can move independently of each other). Such fastening presents little impact on the existing installation of equipment in the space between passages. Furthermore, it makes it possible to use an existing structure (the inter-compressor casing) for transmitting forces to or from the guide rods without adding additional weight. Finally, it makes it possible to reduce projections involved in integrating the guide rods and the inter-compressor casing, thereby serving to limit any impact on the streamlines in the bypass stream.

The bypass stream deflector elements may be flaps secured to the downstream element of the outer wall of the nacelle and suitable, in the thrust-reversal position of the thrust-reverser, for partially obstructing the bypass stream flow passage.

Preferably, the turbojet further comprises a stationary engine casing located upstream from the inter-compressor casing.

The inner wall of the nacelle may have two half-shells, at least one of which is for moving between the maintenance position and the working position. Under such circumstances, the propulsion assembly further comprises movement means for moving the half-shell of the inner wall of the nacelle between its maintenance position and its working position, said movement means comprising a guide rod and a rail-and-slideway system.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
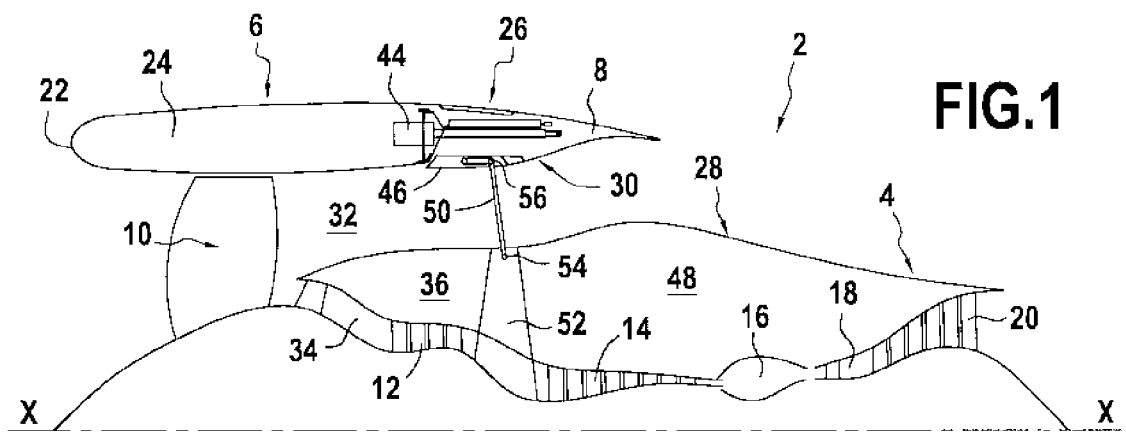
FIGS. 1 and 2 are half-views in longitudinal section of a propulsion assembly of the invention in two different configurations.
Figure 2:
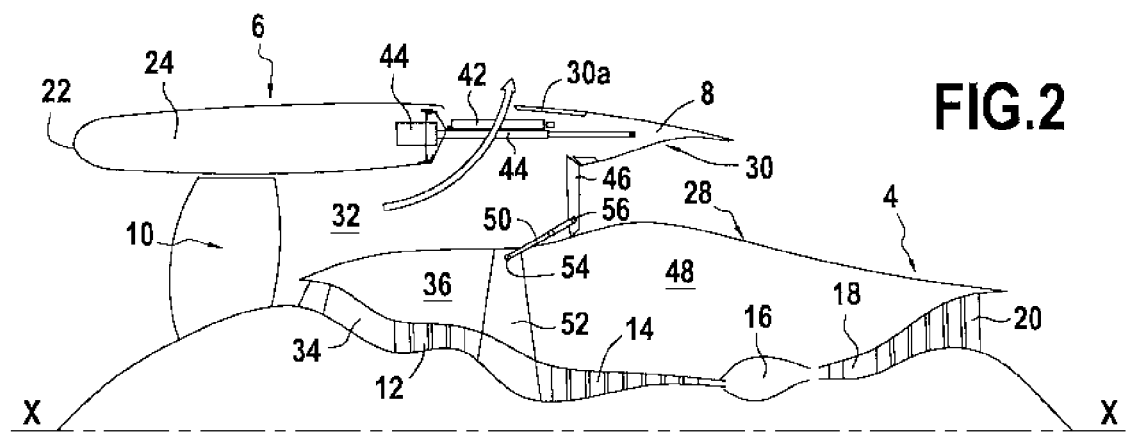

FIGS. 1 and 2 are diagrammatic longitudinal half-section views of a propulsion assembly 2 in an embodiment of the invention.

The propulsion assembly 2 comprises in particular a two-spool bypass type turbojet 4, a nacelle 6 centered on a longitudinal axis X-X of the turbojet 4 and arranged around that axis, and a thrust-reverser 8 arranged in the nacelle.

In known manner, going from upstream to downstream, the turbojet 4 comprises: a fan 10; a low-pressure compressor 12; a high-pressure compressor 14; a combustion chamber 16; a high-pressure turbine 18; and a low-pressure turbine 20.

The turbojet 4 also has a space 48 between passages (also referred to as the "core zone") lying radially between a flow passage 32 for a secondary or "bypass" stream and a flow passage 34 for a primary or "core" stream. The bypass stream flow passage 32 is positioned radially outside the core stream flow passage 34.

The nacelle 6 is of tubular shape, having an air inlet 22 upstream from the turbojet 4, a middle section 24 surrounding the fan 10 of the turbojet, and a downstream section 26 housing the thrust-reverser 8.

More precisely, the downstream section 26 of the nacelle includes an inner annular wall 28 (also known as an inner fixed structure (IFS)) that defines the outside of the space 48 between passages in which a portion of the gas generator of the turbojet is housed (i.e. the elements identified above, not including the fan) and an outer annular wall 30 (also known as the outer fixed structure (OFS)), which is arranged around the inner annular wall 28, being concentric thereabout and serving to define the outside of the bypass stream flow passage 32.

In known manner, this cold stream flow passage is arranged concentrically around a hot stream flow passage 34 (i.e. for the core stream) passing through the turbojet.

The inner annular wall 28 includes at least one movable portion that is movable between a maintenance position (FIG. 5) in which it uncovers the space 48 between passages at least in part, and a working position (FIG. 4) in which it masks said space between passages.

Figure 4:
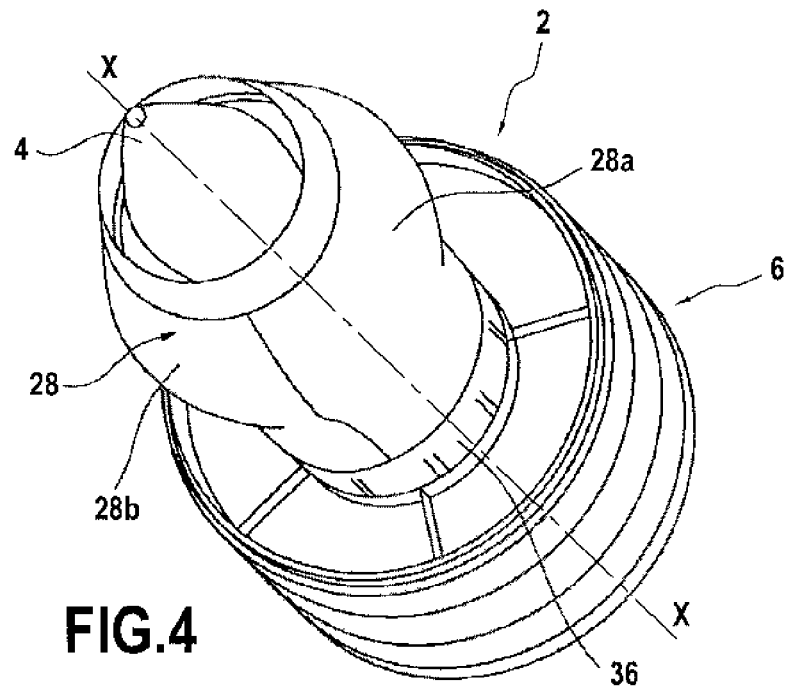
FIGS. 4 and 5 are perspective views of the propulsion assembly in different configurations.
Figure 5:
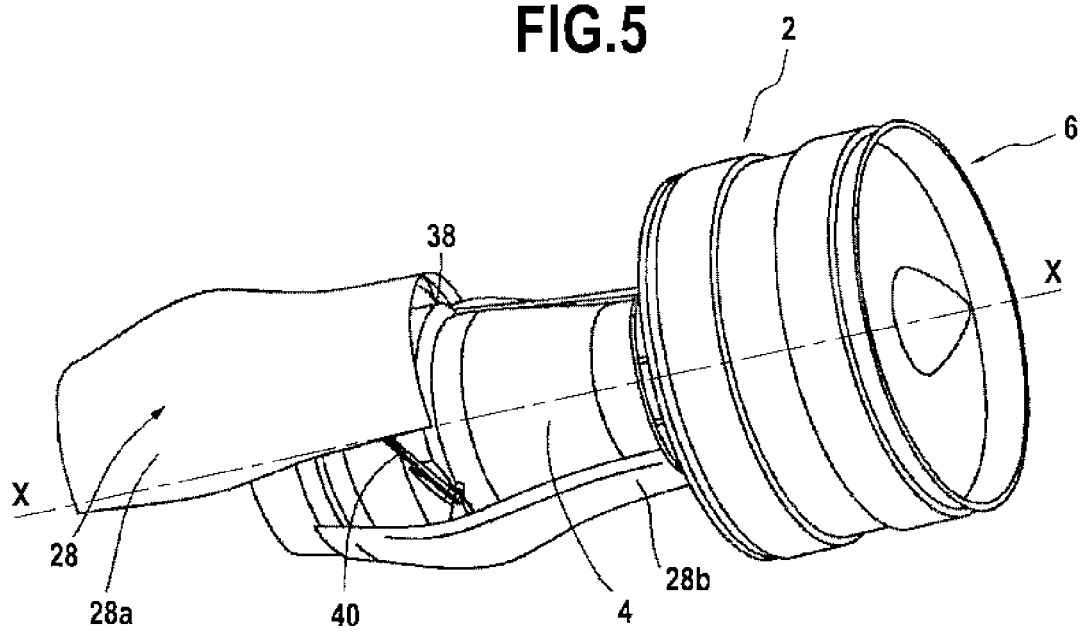

As shown more precisely in FIGS. 4 and 5, the inner wall 28 of the nacelle 6 preferably comprises two half-shells 28a and 28b, each in the form of half a cylinder and arranged on opposite sides of a longitudinal vertical plane of symmetry of the nacelle. These half-shells 28a, 28b are suitable for moving between the working position (FIG. 4) in which they define the inside of the bypass stream flow passage 32, and a maintenance position (FIG. 5). In this space 48 between passages, there may in particular be located certain pieces of equipment of the turbojet (not shown in the figures), such as for example an embedded computer, the accessory gearbox, electrical harnesses, pipework, etc.

In the working position, the inner wall 28 of the nacelle is fastened upstream to the inter-compressor casing 52, which is secured to the turbojet. In this position, the two half-shells 28a and 28b of the inner wall are held in the closed position by a conventional locking system known to the person skilled in the art.

Movement of the half-shells 28a and 28b into the maintenance position is performed by any system known to the person skilled in the art. By way of example, it is possible to use a guide rod 40 and rail-and-slideway 38 system 38, of the kind described in publication FR 2 999 155, to which reference may be made for further details.

It should be observed that the outer wall 30 of the nacelle in this example may be of the "C-duct" type (i.e. made up of two half-shells pivotally mounted on the nacelle 6), of the "O-duct" type (i.e. made up of a single annular cover movable in translation), or of the "D-duct" type (i.e. made up of two half-covers connected to the corresponding half-shells of the inner wall).

The propulsion assembly 2 of the invention also has a thrust-reverser 8, which is integrated in the nacelle. It is possible to envisage various types of thrust-reverser. In the presently-described example, it is a grid type thrust-reverser.

Figure 3:
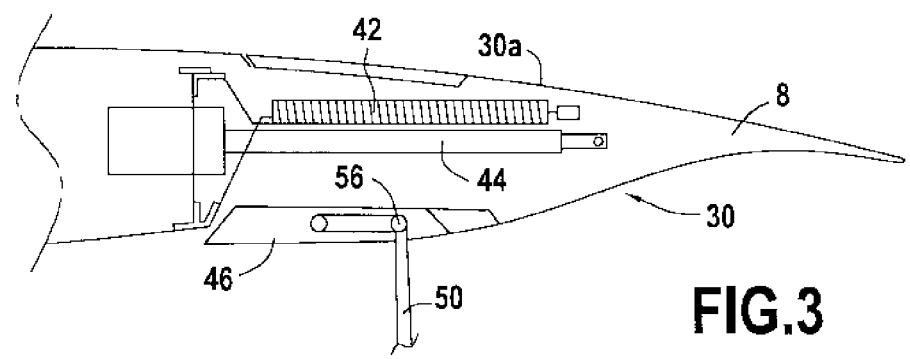
FIG. 3 is an enlargement of FIG. 1 showing details of an embodiment of the thrust-reverser of the propulsion assembly.

In known manner, it comprises a downstream element 30a of the outer wall 30 of the nacelle 6 that is movable in translation between a retracted position (FIGS. 1 and 3) in which it defines the outside of the bypass stream flow passage 32, and a thrust-reversal position that is offset downstream (FIG. 2) in which it uncovers thrust-reverser grids 42 housed in the nacelle.

Preferably, the downstream element 30a of the outer wall 30 of the nacelle is moved by means of actuators 44 fastened to the nacelle in its middle section 24.

Furthermore, moving this downstream element 30a of the outer wall downstream causes bypass stream deflector elements to be deployed in a radial direction. In the example shown in FIGS. 1 to 3, these deflector elements comprise a plurality of flaps 46 that tilt radially into the bypass stream flow passage 32 in order to obstruct it, at least in part. Thus, in this position, the secondary stream flowing in this passage 32 is deflected radially towards the grids 42, through which it passes to the outside with an upstream component so as to provide the aircraft with reverse thrust.

Each of the bypass stream deflector flaps 46 is guided by a guide rod 50 having a first end fastened via a first hinged connection 56 to the flaps 46 and a second end fastened via a second hinged connection 54 to the inter-compressor casing 52 of the turbojet.

The inter-compressor casing 52 of the turbojet is a structural casing arranged between the low pressure compressor 12 and the high pressure compressor 14 of the turbojet (between a stationary engine casing 36 upstream and the half-shells 28*a*, 28*b* of the inner wall of the nacelle, downstream). Typically, the inter-compressor casing 52 serves in particular to pass the accessory drive shaft in a radial direction. It also serves to reconstitute the streamlined passage between the low-pressure compressor and the high-pressure compressor, to take up various forces (from bearings and also thrust forces), to pass services, to ensure that discharge valves operate, to fasten certain shrouds that serve to reconstitute the bypass stream flow passage, etc.

The hinged connection 54 enables each guide rod 50 to pivot about that connection when the bypass stream deflector flaps 46 tilt.

The engine casing 36 is connected to the inter-compressor casing 52 via streamlined fairings, at least one of which may be removable so as to give access to the downstream portion of the turbojet 4 during maintenance operations, while maintaining streamlined continuity for the bypass stream flow passage 32 when the turbojet 4 is in operation.

The invention claimed is:

1. An aircraft propulsion assembly comprising:
    a bypass turbojet having a space between passages separating a core stream flow passage and a bypass stream flow passage, and a stationary inter-compressor casing positioned upstream from said space between passages;
    a nacelle arranged around the turbojet and a downstream end of the nacelle includes an inner annular wall that defines an outside of the space between passages and an inside of the bypass stream flow passage, and an outer annular wall arranged around the inner annular wall and that defines an outside of the bypass stream flow passage, at least a portion of the inner annular wall being suitable for moving between a maintenance position wherein said portion of the inner annular wall uncovers the space between passages at least in part and a working position wherein said portion of the inner annular wall masks the space between passages; and
    a thrust-reverser comprising a downstream element of the outer annular wall that is movable in translation between a retracted position wherein said downstream element of the outer annular wall defines the outside of the bypass stream flow passage and a thrust-reversal position wherein bypass stream deflector elements are deployed in a racial direction, the deployment of said bypass stream deflector elements being controlled by guide rods, each of the guide rods having a first end fastened via a first hinged connection to a deflector element and a second end fastened via a second hinged connection to the stationary inter-compressor casing of the turbojet,
    wherein the stationary inter-compressor casing is axially located between an upstream stationary engine casing and said portion of the inner annular wall.

2. The propulsion assembly according to claim 1, wherein the bypass stream deflector elements are flaps secured to the downstream element of the outer annular wall of the nacelle and suitable, in the thrust-reversal position of the thrust-reverser, for partially obstructing the bypass stream flow passage.

3. The propulsion assembly according to claim 1, wherein the inner annular wall of the nacelle has two half-shells, at least one of which is for moving between the maintenance position and the working position.

4. The propulsion assembly according to claim 3, further comprising movement means for moving the half-shell of the inner annular wall of the nacelle between its maintenance position and its working position, said movement means comprising a guide rod and a rail-and-slideway system.

5. The propulsion assembly according to claim 1, wherein the inner annular wall of the nacelle and the outer annular wall of the nacelle move independently of each other.

* * * * *